(12) United States Patent
Ore

(10) Patent No.: US 7,967,097 B2
(45) Date of Patent: Jun. 28, 2011

(54) MOTORCYCLE SUSPENSION METHOD AND APPARATUS

(76) Inventor: Jeremy Ore, Santee, CA (US)

(*) Notice: Subject to any disclaimer, the term of this patent is extended or adjusted under 35 U.S.C. 154(b) by 315 days.

(21) Appl. No.: 12/154,456

(22) Filed: May 22, 2008

(65) Prior Publication Data

US 2008/0302589 A1    Dec. 11, 2008

Related U.S. Application Data

(60) Provisional application No. 60/933,602, filed on Jun. 6, 2007.

(51) Int. Cl.
*B62K 25/04* (2006.01)
(52) U.S. Cl. .......... 180/227; 280/284; 384/255
(58) Field of Classification Search .......... 180/227; 280/275, 284; 384/255, 265, 280, 299
See application file for complete search history.

(56) References Cited

U.S. PATENT DOCUMENTS

| | | | | |
|---|---|---|---|---|
| 3,616,870 A | * | 11/1971 | Kramer | 180/227 |
| 4,237,744 A | * | 12/1980 | Jolly | 474/116 |
| 4,614,507 A | * | 9/1986 | Ishino | 474/101 |
| 4,789,042 A | * | 12/1988 | Pitts | 180/231 |
| 6,098,986 A | | 8/2000 | Nowak | |
| 6,131,684 A | * | 10/2000 | Ticknovich | 180/227 |
| 6,220,604 B1 | | 4/2001 | Champlin | |
| 6,755,432 B2 | * | 6/2004 | Muser | 280/283 |
| 7,100,264 B2 | | 9/2006 | Skinner et al. | |
| 7,375,277 B1 | | 5/2008 | Skinner et al. | |
| 2009/0208155 A1 | * | 8/2009 | Blane | 384/299 |

OTHER PUBLICATIONS

STA-BO, Swingarm Bushing Stabilizer, Tennessee, www.sta-bo.com, 615-895-8993, at least as early as Jan. 1, 2007.

* cited by examiner

*Primary Examiner* — Anne Marie Boehler
(74) *Attorney, Agent, or Firm* — Steins & Associates, P.C.

(57) ABSTRACT

A motorcycle suspension apparatus and method is provided. In one embodiment, a motorcycle suspension assembly includes a shaft and at least two asymmetric bushings, with each bushing comprising an inner element and an outer element, with the outer element and inner elements constructed of different materials. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

17 Claims, 7 Drawing Sheets

MOTORCYCLE SUSPENSION METHOD AND APPARATUS

This application claims priority from U.S. Provisional Application Ser. No. 60/933,602, filed Jun. 6, 2007, entitled "Motorcycle Suspension Apparatus and Method", which is incorporated herein by reference in its entirety.

FIELD OF THE INVENTION

The present invention generally relates to motorcycles. More particularly, the invention concerns a motorcycle rear suspension method and apparatus.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

However, statistics show that motorcycles are generally more dangerous than automobiles. For example, certain Harley-Davidson motorcycle models exhibit what is commonly referred to as a "high-speed wobble" (or "tank-slapper") which typically involves shaking or instability. Specifically, the front wheel can thrash from side to side, something motorcycle riders refer to as a "tank slapper" because the handlebars suddenly seem intent on battering the fuel tank into submission, causing the rider to lose control of the motorcycle.

Certain Harley-Davidson motorcycle models appear to be more prone to the problem than others. The "FLH" series of Harley-Davidson motorcycles, also known as the Electra Glide, Road King and Ultra Classic, which are widely used by law enforcement officers nationwide have been documented as being prone to instability. "A Harley, when you get it to high speed, has what you call a high-speed wobble," Sgt. R. N. Stallings of the North Carolina Highway Patrol has been quoted as stating. In an otherwise glowing article in 1999, Motorcycle Consumer News described "an oscillation in the chassis that keeps the bike from feeling steady, both while cornering and at elevated speeds."

Therefore, there remains a need to overcome the problem of instability in Harley-Davidson motorcycles. The discussion of the background to the invention included herein is included to explain the context of the invention. This is not to be taken as an admission that any of the material referred to was published, known, or part of the common general knowledge at the priority date of the claims.

Figure 1:
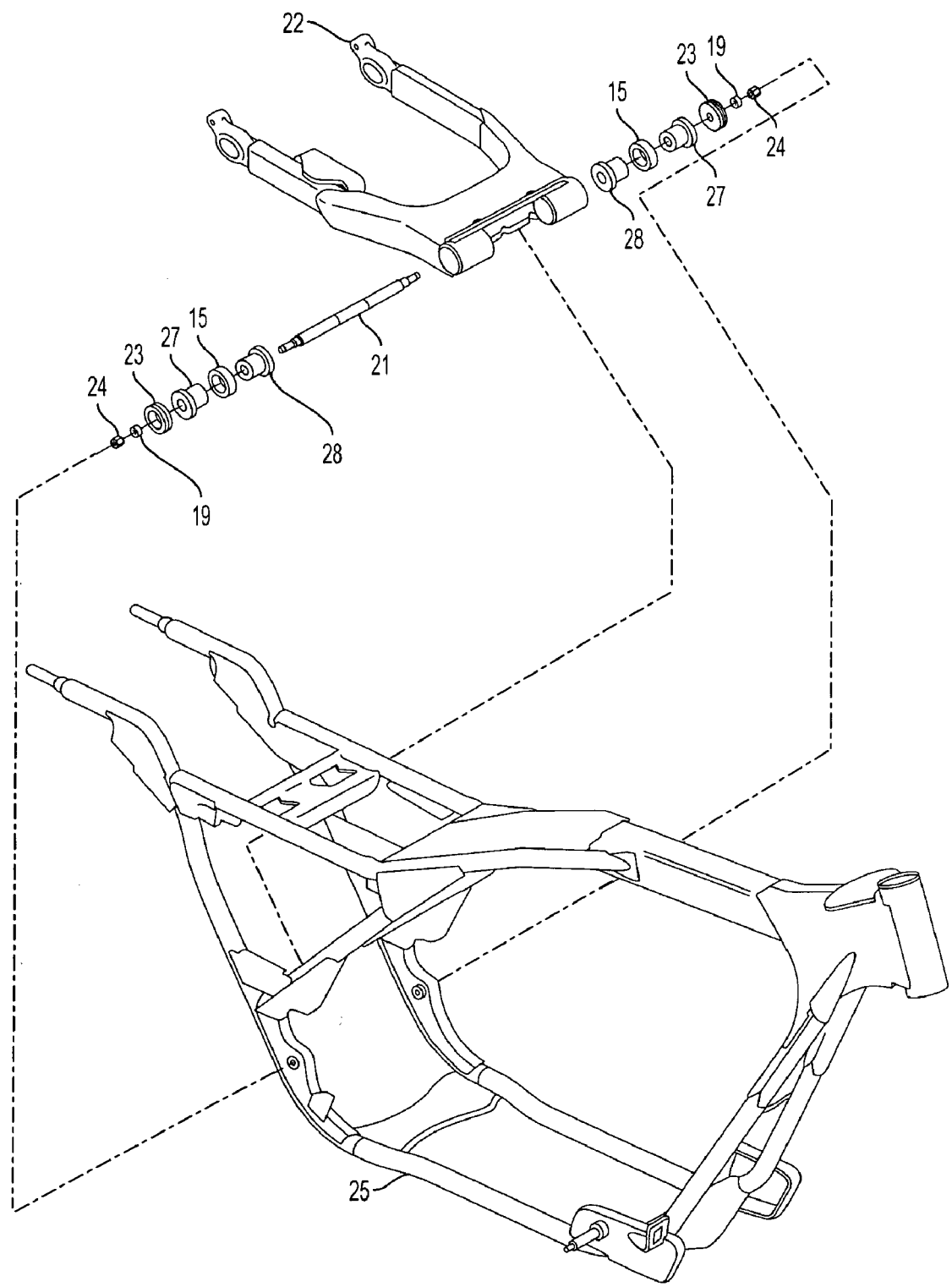
FIG. 1 is an exploded perspective view of a frame, swing arm, and other components of a motorcycle.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following paragraphs, a stability suspension system ("SSS") kit, apparatus and method will be described in detail by way of example with reference to the attached drawings. While the SSS is capable of embodiment in many different forms, there is shown in the drawings and will herein be described in detail specific embodiments, with the understanding that the present disclosure is to be considered as an example of the principles of the SSS and not intended to limit the SSS to the specific embodiments shown and described. That is, throughout this description, the embodiments and examples shown should be considered as exemplars, rather than as limitations on the SSS. As used herein, "SSS" refers to any one of the embodiments of the invention described herein, and any equivalents. Furthermore, reference to various feature(s) of the SSS throughout this document does not mean that all claimed embodiments or methods must include the referenced feature(s).

Motorcycles have been in production for over 100 years, built by manufacturers such as Aprilla, BMW, Buell, Ducati, Harley-Davidson, Honda, Indian, Kawasaki, Moto Guzzi, Suzuki, Triumph, Victory, Yamaha, and others. It will be appreciated that the present invention may be installed on one or more of the motorcycle models or types built by the above-listed manufacturers, or other un-named manufacturers (some, or all of the above-listed manufacturer names may be registered trademarks of their respective owners).

One manufacturer that has become very popular in the United States, as well as through-out the world, is Harley-Davidson. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, the FLHTCUI Ultra Classic Electra Glide, and other models (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, the Sportster 1200S Sport, and other models (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, the FXDWGI Dyna Wide Glide, and other models (some or all of the above model names may be registered trademarks of H-D Michigan, Inc., of Ann Arbor Mich.).

V-Rod models may include the VRSCA V-Rod, VRSCB V-Rod, the VRSCR Street Rod, and other models (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, the FXSTSB Bad Boy, and other models (some or all of the above model names may be registered trademarks of H-D Michigan, Inc., of Ann Arbor Mich.).

Clearly, Harley-Davidson manufactures many different motorcycle models. It will be appreciated that the present invention may be installed on one or more of the above-listed models, or on other models yet to be manufactured. In addition, the present invention may be installed on a "custom" motorcycle, which is a motorcycle that differs from a manufacturer-produced model. For example, a custom motorcycle may be a Harley-Davidson FLHT Electra Glide standard that has had specific parts either added, removed or modified. Or, a custom motorcycle may be built from scratch, using no, or very few pre-manufactured parts, such as only the engine, transmission and tires.

Some Harley-Davidson models have a rubber mounted engine with two mounts, permitting lateral deflection of the swing arm when subjected to side loads, which produces a characteristic wallow and a vague steering response, both of which are extremely detrimental to motorcycle stability and handling. Since at least as early as 1987, these, and other Harley-Davidson motorcycle models, exhibit what is commonly referred to as a "high-speed wobble" (or "tank-slapper") which typically involves shaking or instability of the motorcycle. Specifically, the front wheel can thrash from side to side, something motorcycle riders refer to as a "tank slapper" because the handlebars suddenly seem intent on battering the fuel tank into submission, causing the rider to lose control of the motorcycle.

Certain Harley-Davidson motorcycle models appear to be more prone to the problem than others. The "FLH" series of Harley-Davidson motorcycles, also known as the Electra Glide, Road King and Ultra Classic, which are widely used by law enforcement officers nationwide have been documented as being prone to instability. "A Harley, when you get it to high speed, has what you call a high-speed wobble," Sgt. R. N. Stallings of the North Carolina Highway Patrol has been quoted as stating. In an otherwise glowing article in 1999, Motorcycle Consumer News described "an oscillation in the chassis that keeps the bike from feeling steady, both while cornering and at elevated speeds."

Motorcycle aftermarket part manufacturers, tuners, home builders, and others have attempted to solve this long-felt, but unresolved need to fix the Harley-Davidson motorcycle handling problem using several different approaches and methods resulting in many different products. However, these products either failed to solve the problem, or increased the engine and powertrain vibration transfer to the rider, thereby increasing the "buzzing" felt in the rider's hands and feet. So, after 20 years of trying, the Harley-Davidson motorcycle handling problem had yet to be fixed in a satisfactory manner.

Enter the SSS kit, apparatus and method described herein, which has solved this long-felt need, and achieved remarkable commercial success. Many accolades from independent third parties have been received by the inventor, including the following: "The Glide-Pro (i.e., the SSS) reduced the wobble effect without increasing vibration. This easy to install product still allows the motor to move front to back like it was designed to do, yet reduces the lateral flex that is often encountered on rubber mounted touring models." "In the 15 years we have been in business we have yet to come across anything like this. We think this IS IT!!! Finally!!!" "The Glide Pro (i.e., SSS) installation was a breeze . . . took about an hour. The results are amazing. My FLHX now corners like it's on rails. The rear suspension now works so well, I had to decrease the air pressure in my rear shocks at least 10 lbs. Great Product . . . you guys should send your website address to Harley Davidson so they can get a clue and do the right thing for the FLH series."

When installed, the SSS kit greatly improves motorcycle handling. All evidence of "wallow" or "tank slappers" in long sweeping corners is eliminated. The motorcycle also tracks much better in cross winds and grooved pavement. That is, one embodiment of the SSS kit will improve or substantially eliminate the handling problem associated with certain Harley-Davidson models. For example, the stability and ride quality of the FLH and FLT and other Harley-Davidson models is significantly improved when the SSS kit, described herein, is installed.

In one embodiment, the SSS kit substantially eliminates undesired swing arm movement, generally in the horizontal plane, which is known to cause the instability, or wobble described above. However, the SSS kit also allows the engine, transmission and other components to continue to move.

Figure 2:
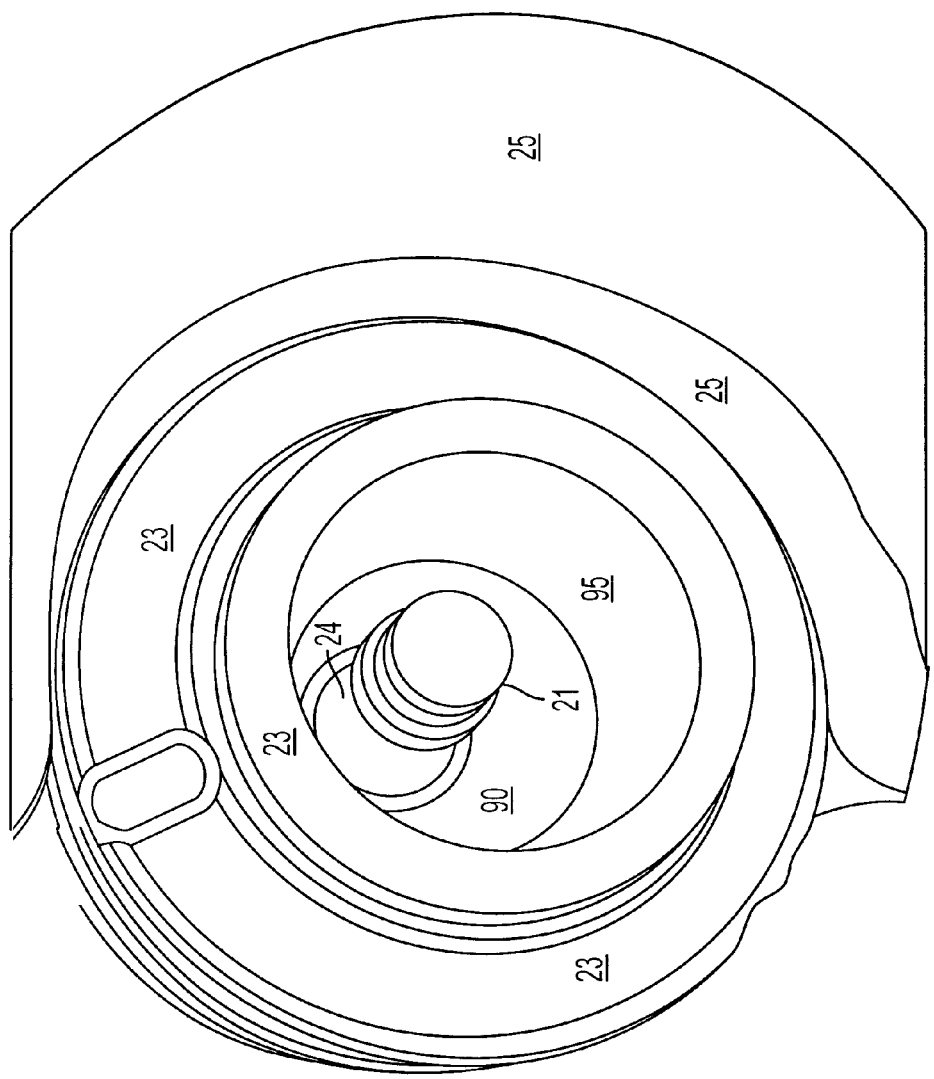
FIG. 2 is a perspective view of the motorcycle frame, "stock" swing arm pivot shaft, and rubber mount illustrated in FIG. 1.

Referring now to FIGS. 1-7, one embodiment of the stability suspension system 5 (hereinafter "SSS") will be described. FIG. 1 illustrates an exploded perspective view of components from a Harley-Davidson FLH touring model. As shown in FIGS. 1 and 2, a swing arm, or rear fork 22 is pivotally attached to motorcycle frame 25 by several components, including: pivot shaft 21; inner spacer 28; bearing 15; outer spacer 27; mounting element, or rubber mount 23; washer 19; and nut 24. Ideally, the swing arm 22 should only pivot about the pivot shaft 21 so that the end of the swing arm 22 (which mounts the rear wheel and tire, not shown) only moves in a vertical direction. However, in an effort to reduce vibration generated by the engine and transmission, the ends of pivot shaft 21 are mounted in mounting elements, or rubber mounts 23, allowing the shaft 21, and thus the swing arm 22 to move laterally, as well as vertically. But, any lateral movement of the rear tire (which is rotatably coupled to the swing arm 22) greatly reduces the stability of the motorcycle, causing the instability discussed above.

Referring now to FIGS. 3-7, one embodiment of the SSS 5 is illustrated. When installed, the SSS 5 greatly reduces, or substantially eliminates any lateral movement of the swing arm 22 (and thus rear tire), greatly increasing the stability of the motorcycle.

Figure 3:
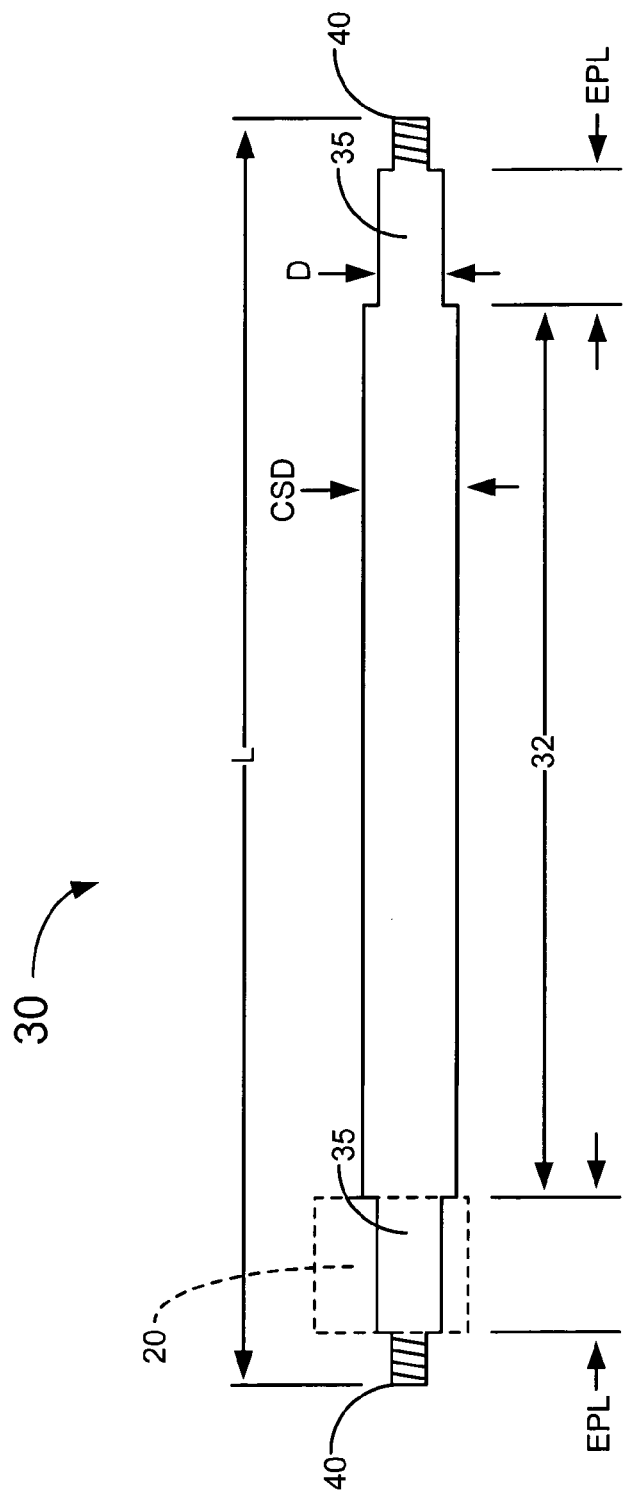
FIG. 3 illustrates a swing arm pivot shaft constructed according to one embodiment the present invention.
Figure 4:
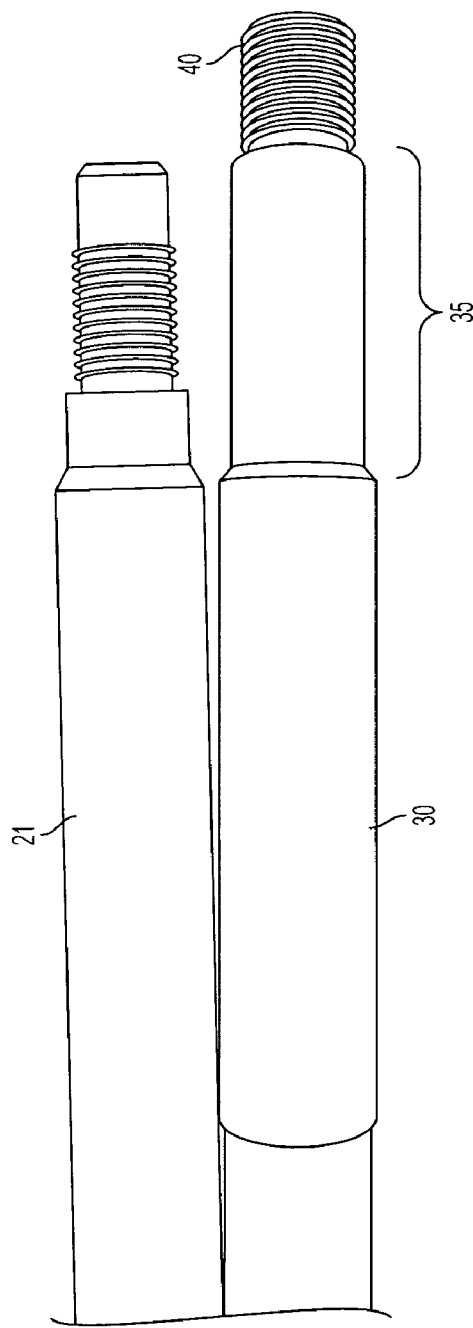
FIG. 4 illustrates the swing arm pivot shaft of FIG. 3 and the "stock" swing arm pivot shaft shown in FIGS. 1-2.
Figure 7:
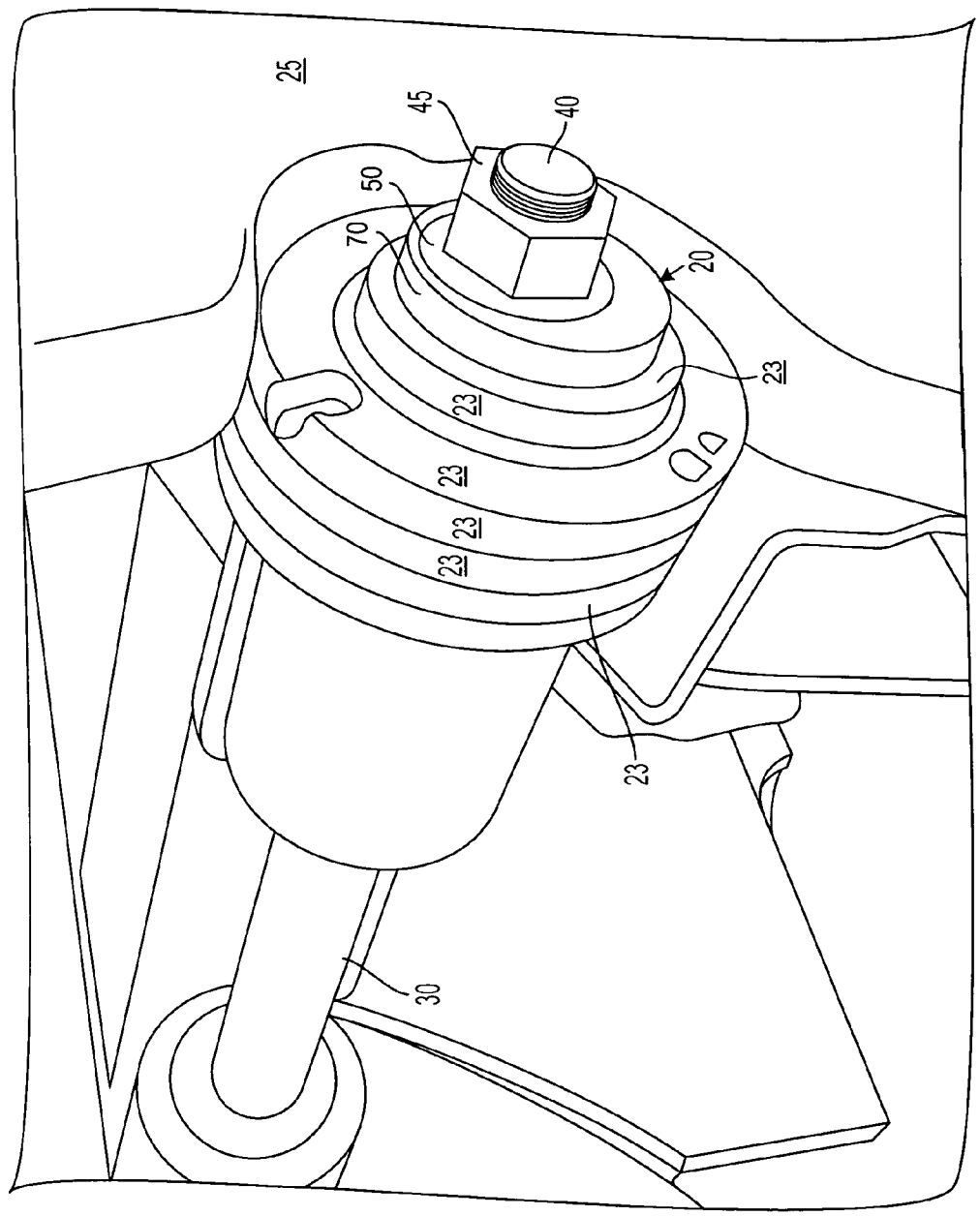
FIG. 7 is a perspective view of the motorcycle frame, replacement swing arm pivot shaft, rubber mount and asymmetric bushing illustrated in the above Figures.

One part of the SSS 5 kit is a replacement swing arm pivot shaft 30 that is installed in place of shaft 21, shown in FIGS. 3-4 and 7. In a preferred embodiment, the SSS 5 replacement swing arm pivot shaft 30 comprises a cylindrical, solid piece of stainless steel (17-4pH, also known as PH 17-4) that preferably is heat treated at about 1150 degrees F. This type of stainless steel has a high-tensile strength and is also extremely corrosion resistant. It will be appreciated that alternative steel types may be employed by the replacement swing arm pivot shaft 30.

A preferred embodiment of the replacement swing arm pivot shaft 30 is illustrated in FIGS. 3 and 4. In addition to being constructed of a superior grade of metal alloy, the replacement swing arm pivot shaft 30 is includes dimensions that differ from the stock, or "originally manufactured," swing arm 21.

Specifically, as shown in FIGS. 3 and 4, the replacement swing arm pivot shaft 30 includes a center section 32 that joins two end portions 35 that each comprise a mounting area for asymmetric bushing 20. In one embodiment, a center section diameter CSD may be about 0.75 of an inch, but in another embodiment the center section diameter CSD may be about 0.62 of an inch. It will be appreciated that other center section diameters CSD may be employed by the replacement swing arm pivot shaft 30.

As shown in FIG. 3, when compared to stock swing arm 21, each end portion 35 has an end portion length EPL that may be about 1.6 inches, but it will be appreciated that other end portion lengths EPL may be employed by the replacement swing arm pivot shaft 30. As illustrated in FIG. 4, when compared to stock swing arm 21, the replacement swing arm pivot shaft 30 has a shaft length SL that is longer than the stock swing arm 21. In one embodiment, the shaft length SL may be about 13.4 inches but it will be appreciated that other shaft lengths SL may be employed by the replacement swing arm pivot shaft 30. As also shown in FIG. 4, when compared to stock swing arm 21, the replacement swing arm pivot shaft 30 includes a diameter D of each end portion 35 that is greater than the stock swing arm 21. In one embodiment, the diameter D may be about 0.62 of an inch, but it will be appreciated that other diameters D may be employed by the replacement swing arm pivot shaft 30. Finally, each end portion 35 terminates in a threaded section 40 that includes threads for receiving a flanged nut 45, as shown in FIGS. 3 and 7.

One feature of the above-described dimensions of the replacement swing arm pivot shaft 30, which differ from the stock swing arm 21, is that the bending stiffness, or resistance to bending of the replacement swing arm pivot shaft 30 is greater than the stock swing arm 21, which contributes to reducing any undesired movement of the swing arm 22.

Figure 5:
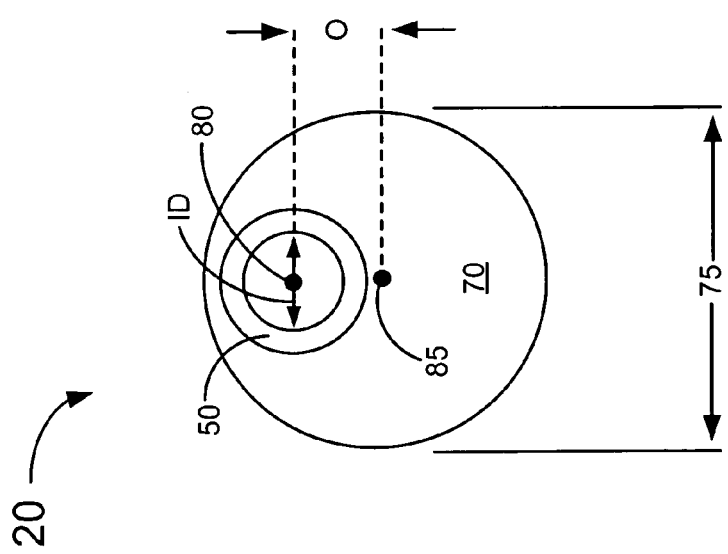
FIG. 5 illustrates an asymmetric bushing constructed according to one embodiment the present invention.
Figure 6:
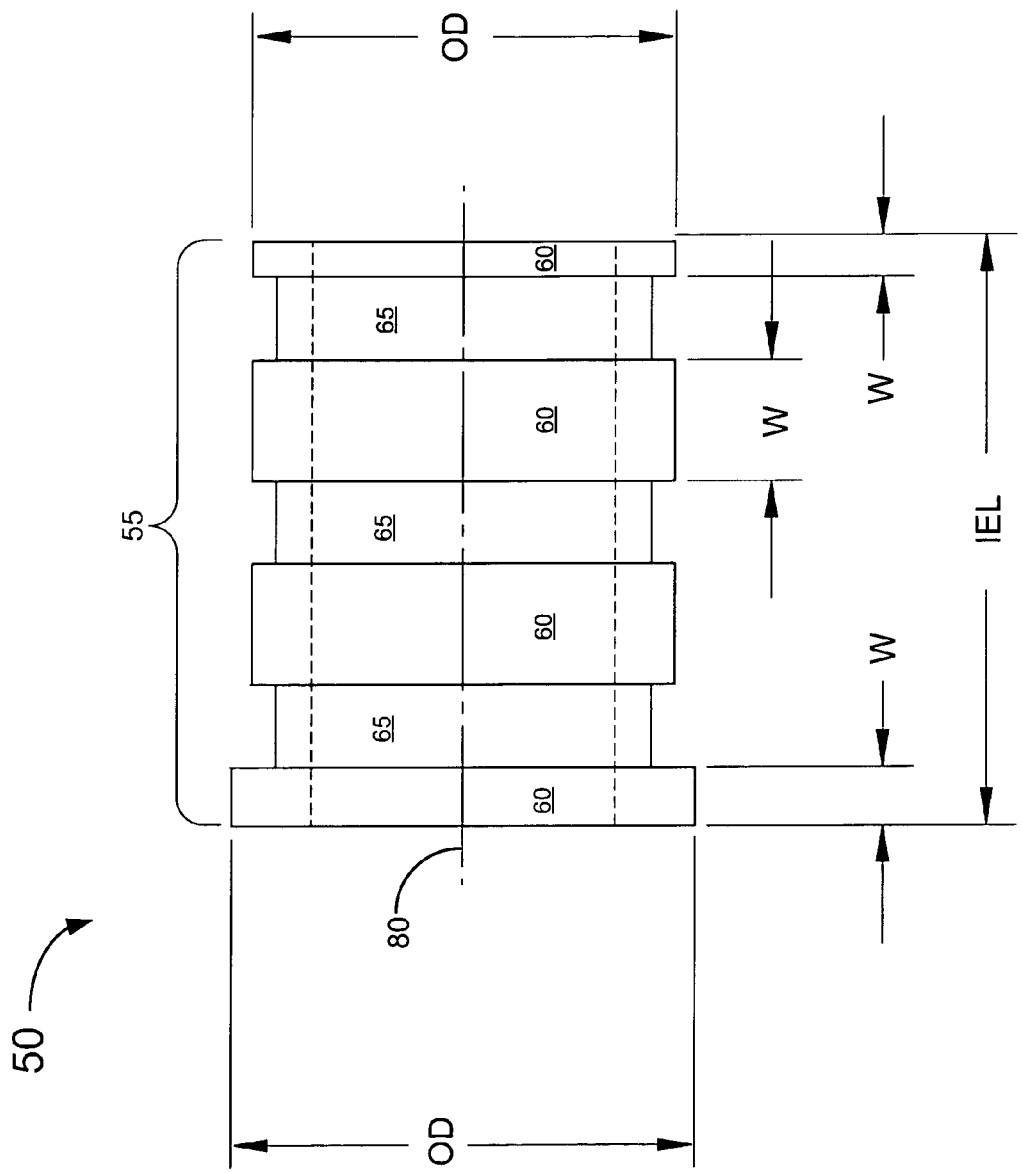
FIG. 6 illustrates an inner element of the asymmetric bushing of FIG. 5.

Referring now to FIGS. 5-7, the SSS 5 includes two asymmetric bushings 20, one of which is illustrated. In a preferred embodiment, the two asymmetric bushings 20 are substantially identical. Each asymmetric bushing 20 comprises an inner element or cylinder 50 having an inner element length IEL of about 1.25 inches and an inner diameter ID of about 0.62 inches. In one embodiment, the inner cylinder 50 comprises a bronze alloy of copper and tin that has been sintered with SAE 30 weight oil. One feature of the inner cylinder 50 is that heat created by the replacement swing arm pivot shaft 30 draws the oil to the inner cylinder 50 surface, enabling the oil to lubricate the interface between the inner cylinder 50 surface and the replacement swing arm pivot shaft 30, which reduces wear and any tendency to gall. It will be appreciated that other materials may be used to construct the inner cylinder 50.

As shown in FIGS. 5 and 6, in one embodiment, the inner element, or cylinder 50 comprises a substantially constant, or smooth inner diameter and a non-constant outer diameter 55. The inner diameter of the inner cylinder substantially matches the outer diameter of the end portions 35 of the replacement swing arm pivot shaft 30 so that one asymmetric bushing 20 can be fitted around each end portion 35.

Referring now to FIG. 6, in one embodiment, the non-constant outer diameter 55 comprises several radial flanges, or elevated sections 60, each having an outer diameter greater than an adjacent non-elevated section 65. For example, in the embodiment illustrated in FIG. 6, four elevated sections 60 are separated by three non-elevated sections 65. A width W of each elevated section 60 may vary, with one elevated section 60 having a width W of about 0.25 of an inch, and another elevated section 60 having a width W of about 0.10 of an inch. It will be appreciated that the number of elevated sections 60 may vary, as well as the width W of each elevated section 60. The outer diameter OD of the elevated sections 60 may also vary, with one elevated section 60 having an outer diameter OD of about 0.95 of an inch and another elevated section 60 having an outer diameter OD of about 0.90 of an inch. It will be appreciated that the outer diameter OD of the elevated sections 60 may vary. In another embodiment, one or more of the elevated sections 60 may include a "knurled", textured, or otherwise non-uniform surface.

Another embodiment of the inner cylinder 50 may comprise a substantially constant, or smooth inner diameter as discussed above, and a non-constant outer diameter 55 comprising two radial flanges or elevated sections 60, each having an outer diameter greater than an adjacent non-elevated section 65. In this embodiment, the two radial flanges or elevated sections 60 are located at the distal ends of the inner cylinder 50, with the portion between the distal ends comprised of a constant outer diameter. Referring to FIG. 6, the elevated sections 60 located at each end of the inner cylinder 50 would be the only elevated sections 60, with the area between the distally-located elevated sections 60 comprising one continuous non-elevated section 65.

As shown in FIG. 5, surrounding the inner cylinder 50 is outer member or element 70. In one embodiment, outer element 70 has a substantially circular perimeter and is comprised of a material having a durometer (A scale) of 35, but the material may range from a durometer of 20 to a durometer of 50 (both A scale). Generally "durometer" is one of several ways to indicate the hardness of a material, and is defined as the material's resistance to permanent indentation. The term durometer is often used to refer to the measurement, as well as the instrument itself. Durometer is typically used as a measure of hardness in polymers, elastomers and rubbers. There are several scales of durometer, used for materials with different properties. The two most common scales, using slightly different measurement systems, are the A and D scales. The A scale is for softer plastics, while the D scale is for harder ones.

In one embodiment, the outer element 70 is comprised of a polyurethane that is mixed in a 2 to 1 ratio. The outer element 70 may be comprised of RU-440 (manufactured by Silpak, Inc, of Pomona, Calif.) or any equivalents that provide a durometer range between 20 and 50. It will be appreciated that other urethanes, mixtures or combinations of urethanes, or polyurethanes may be employed that will best withstand the operating environment. For example, the outer element 70 may be comprised of at least one material selected from a group consisting of: plastics, polymers, polyesters, polyolefins, polycarbonates, polyamides, polyethers, polyethylene, polytetrafluoroethylene, silicone, silicone rubber, rubber, polyurethane, DACRON, TEFLON, polyvinyl chloride, polystyrene, nylon, or latex rubber (DACRON and TEFLON are registered trademarks of E.I. du Pont de Nemours and Company of Wilmington, Del.).

For example, one embodiment of the outer element 70 comprises a urethane RTV. RTV stands for Room-Temperature Vulcanizing, which is a term for rubber compounds that solidify and stabilize at room temperature. Generally, RTV rubber is a two-part mixture that uses a chemical instead of heat for curing. Thus, one method of manufacturing the outer element 70 is to mix the urethane and curing product in a 2 to 1 ratio, and pour the mixture about the inner cylinder 50, which is located within a mold (not shown) so that an outer diameter of the outer element 70 is approximately 1.35 inches, and the height, or thickness of the outer member is about 1.25 inches so that it substantially matches the inner element length IEL. It will be appreciated that the process may vary, and the dimensions of the inner cylinder 50 and outer element 70 may also vary. As shown in FIG. 5, the combination of the inner cylinder 50 and outer element 70 comprise the asymmetric bushing 20. In a preferred embodiment, the "stepped" outer surface of the inner cylinder 50 created by the elevated sections 60 (which may also include the "knurled" surface) prevents the outer element 70 and the inner cylinder from moving relative to each other.

Referring again to FIG. 5, Offset O illustrates the offset between the longitudinal axis 80 of the inner cylinder 50 (shown in FIG. 6) relative to the longitudinal axis 85 of the outer element 70, which in FIG. 5 is perpendicular to the page (i.e., extends out of the page). In one embodiment the offset O may be about 0.19 inches, but will be appreciated that the amount of offset O may vary. It will also be appreciated that FIG. 5 is not drawn to scale, so that the offset 0 may be more clearly illustrated.

Referring now to FIGS. 1-2 and 7, when the SSS kit 5 is installed on the motorcycle frame 25, the stock swing arm pivot shaft 21 is removed, and replacement swing arm pivot shaft 30 is installed. Washers 19 are removed and replaced by asymmetric bushings 20. Each asymmetric bushing 20 fits within each mounting element, or rubber mounts 23 (also known as "cleve blocks"), as shown in FIG. 7, and decrease the "play" or deflection of the rubber mounts 23 that help to pivotally couple the replacement swing arm pivot shaft 30 to the frame 25. That is, the asymmetric bushing 20 "fills" the interior volume of the rubber mount 23 (shown in FIG. 2) so that any deflection of the rubber mount 23 is supported, or resisted by the asymmetric bushing 20. Specifically, as shown in FIG. 2, and indirectly in FIG. 7, each rubber mount 23 includes an interior "cup" or "void" that has a substantially planar base 90 where the washer 19 and nut 24 are located, and a substantially cylindrical wall 95 that extends from the planar base 90. As shown in FIG. 7, the interior volume of the rubber mount 23 is filled by the asymmetric bushing 20, so the shape of the interior volume of the rubber mount 23 is substantially the opposite of the exterior dimensions of the asymmetric bushing 20. In addition, the offset O of the longitudinal axis 80 of the inner cylinder 50 relative to the longitudinal axis 85 of the outer element 70 allows the asymmetric bushing 20 to fit within rubber mount 23, as the swing arm pivot shaft (either stock 21 or replacement 30) is asymmetrically located within the interior "void" formed by the planar base 90 and the substantially cylindrical wall 95 of each rubber mount 23.

After installation of the two asymmetric bushings 20, the "stiffness" or spring rate between the replacement swing arm pivot shaft 30 and the frame 25 is increased, thereby reducing the amount of swing arm 22 lateral movement, which of course, reduces the lateral movement of the rear tire, thereby increasing the stability of the motorcycle. However, the "stiffness" is not so great as to allow excessive vibration to transfer through the shaft 21 and into the frame 25, so that ride quality is maintained. Put differently, there is no additional vibration or stiffness as felt at the feet and hands of the rider. This is, in part, due to the hardness, or lack thereof, of the outer element 70.

As described above, and with reference to the Figures, one embodiment of the SSS kit 5 comprises a motorcycle suspension kit comprising an elongated member comprising two end portions joined by a center section and at least two bushings, each bushing positionable about each elongated member end portion, with each bushing comprising an inner element and an outer element composed of a different material than the inner element, with the inner element asymmetrically located in the outer element. The asymmetric location of the inner element relative to the outer element is achieved by locating a longitudinal axis of the inner element at an offset from a longitudinal axis of the outer element, and the elongated member comprises a substantially cylindrical metal shaft with each end portion comprising an elongate section sized to receive one of the at least two bushings. The bushing inner element comprises a substantially tubular member having a substantially constant inner diameter and a non-constant outer diameter, where the non-constant outer diameter comprises a radial flange located at each distal end of the bushing inner element. An outer surface of the bushing inner element may be selected from a group consisting of: a substantially smooth outer surface area and a substantially knurled outer surface area, and the outer element comprises a material having an A scale durometer ranging from 20 to 50.

Another embodiment of the SSS kit 5 comprises a motorcycle suspension kit for removeably attaching a motorcycle swing arm to a motorcycle frame, the motorcycle suspension kit comprising a swing arm pivot shaft structured to pivotably couple the motorcycle swing arm to the motorcycle frame, the swing arm pivot shaft comprising two end portions joined by a center section. The SSS kit 5 also includes two asymmetric bushings, with one asymmetric bushing positionable about each end portion of the swing arm pivot shaft, each asymmetric bushing comprising an outer bushing element comprising a substantially circular perimeter and a substantially cylindrical inner bushing element mounted asymmetrically within the substantially circular outer bushing element. The elongated member comprises a substantially cylindrical metal shaft with each end portion comprising an elongate section sized to receive one of the two asymmetric bushings. The inner bushing element comprises a substantially tubular element having a substantially constant inner diameter and a non-constant outer diameter, where the non-constant outer diameter comprises a radial flange located at each distal end of the inner bushing element and the outer bushing element comprises a material having an A scale durometer a range from 20 to 50. The asymmetric mounting of the inner bushing element relative to the outer bushing element is achieved by locating a longitudinal axis of the inner bushing element at an offset from a longitudinal axis of the outer bushing element.

One method for removeably attaching the SSS kit 5 to a motorcycle may include the steps of removing a first swing arm pivot shaft (the "stock" or original manufactured part) and the two mounting elements from the motorcycle frame and pivotably coupling an elongated swing arm pivot shaft to the motorcycle frame, the elongated swing arm pivot shaft comprising two end portions joined by a center section. Then, removeably positioning two mounting elements substantially about the two end portions of the second swing arm pivot shaft and removeably positioning an asymmetric bushing substantially within each mounting element, with each asymmetric bushing comprising an outer bushing element sized to fit substantially within the mounting element and a substantially cylindrical inner bushing element mounted asymmetrically within the substantially circular outer bushing element. Each mounting element includes an interior volume formed by a substantially planar base and a substantially cylindrical wall, with the interior volume filled by each asymmetric bushing.

Thus, it is seen that a replacement motorcycle suspension kit is provided that improves the originally manufactured motorcycle suspension. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A motorcycle suspension kit, comprising:
   an elongated member comprising two end portions joined by a center section; and
   at least two bushings, each bushing positionable about each elongated member end portion, with each bushing comprising an inner element and an outer element composed of a different material than the inner element, with the inner element asymmetrically located in the outer element, where the outer element comprises a material having an A scale durometer hardness reading ranging from 20 to 50.

2. The motorcycle suspension kit of claim 1, where the asymmetric location of the inner element relative to the outer element is achieved by locating a longitudinal axis of the inner element at an offset from a longitudinal axis of the outer element.

3. The motorcycle suspension kit of claim 1, where elongated member comprises a substantially cylindrical metal shaft with each end portion comprising an elongate section sized to receive one of the at least two bushings.

4. The motorcycle suspension kit of claim 1, where the bushing inner element comprises a substantially tubular member having a substantially constant inner diameter and a non-constant outer diameter.

5. The motorcycle suspension kit of claim 4, where the non-constant outer diameter comprises a radial flange located at each distal end of the bushing inner element.

6. The motorcycle suspension kit of claim 1, where an outer surface of the bushing inner element is selected from a group consisting of: a substantially smooth outer surface area and a substantially knurled outer surface area.

7. A motorcycle suspension kit for removeably attaching a motorcycle swing arm to a motorcycle frame, the motorcycle suspension kit comprising:

a swing arm pivot shaft structured to pivotably couple the motorcycle swing arm to the motorcycle frame, the swing arm pivot shaft comprising two end portions joined by a center section;
two asymmetric bushings, with one asymmetric bushing positionable about each end portion of the swing arm pivot shaft, each asymmetric bushing comprising:
   an outer bushing element comprising a substantially circular perimeter where the outer bushing element comprises a material having an A scale durometer reading in the range from 20 to 50; and
   a substantially cylindrical inner bushing element mounted asymmetrically within the substantially circular outer bushing element.

8. The motorcycle suspension kit of claim 7, where the elongated member comprises a substantially cylindrical metal shaft with each end portion comprising an elongate section sized to receive one of the two asymmetric bushings.

9. The motorcycle suspension kit of claim 7, where the inner bushing element comprises a substantially tubular element having a substantially constant inner diameter and a non-constant outer diameter.

10. The motorcycle suspension kit of claim 9, where the non-constant outer diameter comprises a radial flange located at each distal end of the inner bushing element.

11. The motorcycle suspension kit of claim 7, where the asymmetric mounting of the inner bushing element relative to the outer bushing element is achieved by locating a longitudinal axis of the inner bushing element at an offset from a longitudinal axis of the outer bushing element.

12. A method of removeably attaching a motorcycle swing arm pivot shaft to a motorcycle frame, the method comprising the steps of:
   a) pivotably coupling an elongated swing arm pivot shaft to the motorcycle frame, the elongated swing arm pivot shaft comprising two end portions joined by a center section;
   b) removeably positioning two mounting elements substantially about the two end portions of the second swing arm pivot shaft;
   c) removeably positioning an asymmetric bushing substantially within each mounting element, with each asymmetric bushing comprising an outer bushing element sized to fit substantially within the mounting element and a substantially cylindrical inner bushing element mounted asymmetrically within the substantially circular outer bushing element, where said bushing inner element comprises a substantially tubular member having a substantially constant inner diameter and a non-constant outer diameter and where said outer bushing element comprises a material having an A scale durometer hardness reading ranging from 20 to 50.

13. The method of claim 12, further comprising the step of:
   a1) removing a first swing arm pivot shaft and the two mounting elements from the motorcycle frame; and
   b) performing steps a) through c).

14. The method of claim 12, where each mounting element includes an interior volume formed by a substantially planar base and a substantially cylindrical wall, with the interior volume filled by each asymmetric bushing.

15. A motorcycle suspension kit, comprising:
   an elongated member comprising two end portions joined by a center section; and at least two bushings, each bushing positionable about each elongated member end portion, with each bushing comprising an inner element and an outer element composed of a different material than the inner element, with the inner element asymmetrically located in the outer element,
where the bushing inner element comprises a substantially tubular member having a substantially constant inner diameter and a non-constant outer diameter; and
where the bushing outer element comprises a material having an A scale durometer hardness reading ranging from 20 to 50.

16. The motorcycle suspension kit of claim 15, where the non-constant outer diameter comprises a radial flange located at each distal end of the bushing inner element.

17. A motorcycle suspension kit, comprising:
an elongated member comprising two end portions joined by a center section; and at least two bushings, each bushing positionable about each elongated member end portion, with each bushing comprising an inner element and an outer element composed of a different material than the inner element, with the inner element asymmetrically located in the outer element, where an outer surface of the bushing inner element is selected from a group consisting of: a substantially smooth outer surface area and a substantially knurled outer surface area, and where the outer element comprises a material having an A scale durometer hardness reading ranging from 20 to 50.

* * * * *